United States Patent
Li et al.

(10) Patent No.: US 9,984,683 B2
(45) Date of Patent: May 29, 2018

(54) AUTOMATIC SPEECH RECOGNITION USING MULTI-DIMENSIONAL MODELS

(71) Applicant: Google LLC, Mountain View, CA (US)

(72) Inventors: Bo Li, Santa Clara, CA (US); Tara N. Sainath, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/217,457

(22) Filed: Jul. 22, 2016

(65) Prior Publication Data

US 2018/0025721 A1 Jan. 25, 2018

(51) Int. Cl.
*G10L 15/16* (2006.01)
*G10L 15/02* (2006.01)
*G06N 3/08* (2006.01)
*G10L 15/26* (2006.01)

(52) U.S. Cl.
CPC ............ *G10L 15/16* (2013.01); *G06N 3/08* (2013.01); *G10L 15/02* (2013.01); *G10L 15/26* (2013.01); *G10L 2015/025* (2013.01)

(58) Field of Classification Search
None
See application file for complete search history.

(56) References Cited

U.S. PATENT DOCUMENTS

| | | | | |
|---|---|---|---|---|
| 9,368,110 | B1* | 6/2016 | Hershey | G10L 25/51 |
| 9,653,093 | B1* | 5/2017 | Matsoukas | G10L 15/08 |
| 2016/0071526 | A1* | 3/2016 | Wingate | G10L 21/028 |
| | | | | 704/233 |
| 2016/0099010 | A1* | 4/2016 | Sainath | G10L 25/30 |
| | | | | 704/232 |
| 2016/0171974 | A1* | 6/2016 | Hannun | G10L 15/063 |
| | | | | 704/232 |
| 2016/0284347 | A1* | 9/2016 | Sainath | G10L 15/16 |
| 2016/0358602 | A1* | 12/2016 | Krishnaswamy | G10L 15/20 |
| 2017/0092265 | A1* | 3/2017 | Sainath | G10L 15/16 |
| 2017/0103752 | A1* | 4/2017 | Senior | G10L 15/16 |
| 2017/0147910 | A1* | 5/2017 | Mao | G06K 9/726 |
| 2017/0148433 | A1* | 5/2017 | Catanzaro | G10L 15/02 |
| 2017/0154033 | A1* | 6/2017 | Lee | G06F 17/218 |
| 2017/0178664 | A1* | 6/2017 | Wingate | G10L 21/0308 |

OTHER PUBLICATIONS

Li (Li, Jinyu, et al. "Exploring multidimensional LSTMs for large vocabulary ASR." Acoustics, Speech and Signal Processing (ICASSP), 2016 IEEE International Conference on. IEEE, 2016.; ICASSP 2016 was held from Mar. 20-Mar. 25; also cited by Applicant in IDS).*

(Continued)

*Primary Examiner* — Pierre-Louis Desir
*Assistant Examiner* — Jonathan Kim
(74) *Attorney, Agent, or Firm* — Fish & Richardson P.C.

(57) ABSTRACT

Methods, systems, and apparatus, including computer programs encoded on a computer storage medium, for automatic speech recognition using multi-dimensional models. In some implementations, audio data that describes an utterance is received. A transcription for the utterance is determined using an acoustic model that includes a neural network having first memory blocks for time information and second memory blocks for frequency information. The transcription for the utterance is provided as output of an automated speech recognizer.

16 Claims, 4 Drawing Sheets

(56) References Cited

OTHER PUBLICATIONS

Sainath (Sainath, Tara N., et al. "Convolutional, long short-term memory, fully connected deep neural networks." Acoustics, Speech and Signal Processing (ICASSP), 2015 IEEE International Conference on. IEEE, 2015; ICASSP 2015 was held from Apr. 19-Apr. 24.; also cited by Applicant in IDS).*
Seide (Seide, Frank, Gang Li, and Dong Yu. "Conversational speech transcription using context-dependent deep neural networks." Twelfth Annual Conference of the International Speech Communication Association. 2011.)*
Li, Jinyu, et al. "Exploring multidimensional LSTMs for large vocabulary ASR." Acoustics, Speech and Signal Processing (ICASSP), 2016 IEEE International Conference on. IEEE, 2016.; ICASSP 2016 was held from Mar. 20-Mar. 25.*
Sainath, Tara N., et al. "Convolutional, long short-term memory, fully connected deep neural networks." Acoustics, Speech and Signal Processing (ICASSP), 2015 IEEE International Conference on. IEEE, 2015; ICASSP 2015 was held from Apr. 19-Apr. 24.*
Seide, Frank, Gang Li, and Dong Yu. "Conversational speech transcription using context-dependent deep neural networks." Twelfth Annual Conference of the International Speech Communication Association. 2011.*
Bluche et al., "Scan, Attend and Read: End-to-End Handwritten Paragraph Recognition with MDLSTM Attention," arXiv preprint arXiv:1604.03286, Apr. 2016, pp. 1-10.
Chherawala et al., "Context-dependent BLSTM models. Application to offline handwriting recognition," 2014 IEEE International Conference on Image Processing (ICIP), Oct. 2014, pp. 2565-2569.
Chu, "Grid-LSTM," MIT Content Upload, Sep. 2015, PowerPoint Presentation, 17 pages.
Dean et al., "Large Scale Distributed Deep Networks," Advances in Neural Information Processing Systems (NIPS), 2012, pp. 1223-1231.
Glorot et al., "Understanding the Difficulty of Training Deep Feedforward Neural Networks," in Proc. AISTATS, May 2010, vol. 9, pp. 249-256.
Graves et al., "Multi-Dimensional Recurrent Neural Networks," in Proc. ICANN, May 2007, 10 pages.
Graves, "Offline Arabic Handwriting Recognition with Multidimensional Recurrent Neural Networks," Guide to OCR for Arabic Scripts. Springer London, 2012, pp. 297-313.
Hinton et al., "Deep Neural Networks for Acoustic Modeling in Speech Recognition," IEEE Signal Processing Magazine, vol. 29, No. 6, Nov. 2012, pp. 82-97.
Hochreiter et al., "Long Short-Term Memory," Neural Computation, vol. 9, No. 8, pp. 1735-1780, 1997.
Kaiser et al., "Neural GPUs Learn Algorithms," arXiv preprint arXiv:1511.08228, Mar. 2016, pp. 1-9.
Kalchbrenner et al., "Grid Long Short-Term Memory," arXiv preprint arXiv:1507.01526, Jan. 2016, pp. 1-15.
Kalchbrenner et al., "Grid LSTM," Joost Bastings, Institute for Logic, Language and Computation, PowerPoint Presentation, Mar. 10, 2016, 194 pages.
Koutnik, "The Deepest Learning" IDSIA, 2015, PowerPoint, retrieved on Jul. 21, 2016. Retrieved from the Internet: URL<http://www.s-i.ch/fileadmin/daten/sgaico/Koutnik_sgaico2015.pdf>, 37 pages.
Le, "A Tutorial on Deep Learning Part 2: Autoencoders, Convolutional Neural Networks and Recurrent Neural Networks," Stanford, Oct. 2015, pp. 1-20.
Li et al., "Exploring Multidimensional LSTMs for Large Vocabulary ASR," 2016 IEEE International Conference on Acoustics, Speech and Signal Processing (ICASSP), Mar. 2016, pp. 4940-4944.
Li et al., "LSTM Time and Frequency Recurrence for Automatic Speech Recognition," 2015 IEEE Workshop on Automatic Speech Recognition and Understanding (ASRU), Dec. 2015, pp. 187-191.
Li et al., "Neural Network Adaptive Beamforming for Robust Multichannel Speech Recognition," in submitted to Proc. INTERSPEECH, 2016, 5 pages.
Li, "Improving Information Flow in Recurrent Networks," Yanran's Attic, Nov. 28, 2015 [retrieved on Jul. 21, 2016]. Retrieved from the Internet: URL<http://yanran.li/peppypapers/2015/11/28/improving-information-flow-in-recurrent-networks.html>, 13 pages.
Olah, "Understanding LSTM Networks," colah's blog, Aug. 27, 2015 [retrieved on Jul. 21, 2016]. Retrieved from the Internet: URL<http://colah.github.io/posts/2015-08-Understanding-LSTMs/>, 9 pages.
Raja, "FNNs, RNNs, LSTM and BLSTM," PowerPoint, retrieved on Jul. 21, 2016. Retrieved from the Internet: URL<http://cse.jitkgp.ac.in/~psraja/FNNs%20.RNNs%20.LSTM%20and%20BLSTM.pdf>, 36 pages.
Sainath et al., "Convolutional, Long Short-Term Memory, Fully Connected Deep Neural Networks," 2015 IEEE International Conference on Acoustics, Speech and Signal Processing (ICASSP), Apr. 2015, pp. 4580-4584.
Sainath et al., "Factored Spatial and Spectral Multichannel Raw Waveform CLDNNs," International Conference on Acoustics, Speech and Signal Processing (ICASSP), Mar. 2016.
Sainath et al., "Improvements to Deep Convolutional Neural Networks for LVCSR," Automatic Speech Recognition and Understanding (ASRU), 2013 IEEE Workshop on, Dec. 2013, pp. 315-320.
Sainath et al., "Learning the Speech Front-end with Raw Waveform CLDNNs," in Proc. Interspeech, Sep. 2015, 5 pages.
Sak et al., "Long Short-Term Memory Based Recurrent Neural Network Architectures for Large Vocabulary Speech Recognition," arXiv preprint arXiv:1402.1128, Feb. 2014, pp. 1-5.
Sak et al., "Long Short-Term Memory Recurrent Neural Network Architectures for Large Scale Acoustic Modeling," in Proc. Interspeech 2014, Sep. 2014, pp. 338-342.
Sapunov, "Multi-dimensional RNNs," SlideShare, Apr. 27, 2016 [retrieved on Jul. 21, 2016]. Retrieved from the Internet: URL<http://www.slideshare.net/grigorysapunov/multidimensional-rnn>, 36 pages.
Schmidhuber, "Recurrent Neural Networks," online citation, updated 2015 [retrieved on Jul. 21, 2016]. Retrieved from the Internet: URL<http://people.idsia.ch/~juergen/rnn.html>, 10 pages.
Stollenga et al., "Parallel Multi-Dimensional LSTM, With Application to Fast Biomedical Volumetric Image Segmentation," In Advances in Neural Information Processing Systems (NIPS), 2015, pp. 2998-3006.
Visin et al., "ReNet: A recurrent neural network based alternative to convolutional networks," arXiv preprint arXiv:1505.00393, Jul. 2015, pp. 1-9.
Zhang et al., "Highway Long Short-Term Memory RNNS for Distant Speech Recognition," arXiv preprint arXiv:1510.08983, Jan. 2016, pp. 1-5.
Sainath. "Towards End-to-End Speech Recognition Using Deep Neural Networks," PowerPoint presentation, Deep Learning Workshop, ICML, Jul. 10, 2015, 51 pages.

* cited by examiner

AUTOMATIC SPEECH RECOGNITION USING MULTI-DIMENSIONAL MODELS

BACKGROUND

Automated speech recognition (ASR) systems attempt to determine the content of speech. Many ASR systems use an acoustic model to predict which sounds are present in audio data, and use a language model to predict which words were spoken.

SUMMARY

In some implementations, an ASR system uses an acoustic model that includes a recurrent neural network having a multi-dimensional memory architecture. For example, an acoustic model may include a grid or other multi-dimensional arrangement that includes separate memory cells for time-domain information and frequency-domain information. The memory can be implemented as long short-term memory (LSTM) layers. In some implementations, such as a grid-LSTM arrangement, certain memory cells from one dimension may share information with one or more memory cells from another dimension. For example, a time-LSTM cell may share information with a frequency-LSTM cell, and a frequency-LSTM cell may share information with a time-LSTM cell.

In some implementations, the memory cells in a two-dimensional LSTM architecture can be arranged with a grid-like relationships. There can be a number of frequency steps or bins, and also a number of time steps. Two LSTMs are used to model each combination of time and frequency, referred to as a "time-frequency bin." The two LSTMs for the time-frequency bin can include a grid frequency LSTM (gF-LSTM) and a grid time LSTM (gT-LSTM). At a given time-frequency bin, the frequency-focused gF-LSTM uses the state of the time-focused gT-LSTM from the previous timestep. Similarly the gT-LSTM uses the state of the gF-LSTM from the previous frequency step. This arrangement allows separate LSTMs to model the correlations in time and frequency, while also allowing information to be shared between the memory cells for the different dimensions.

Acoustic modeling for ASR presents a number of challenges. Accuracy of predictions, which is often measured in terms of word error rate (WER), is one of the main criteria for measuring the performance of acoustic models. Convolutional neural network layers have been used with high accuracy in some instances for audio with low noise levels. However, convolutional layers often decrease performance when noise is present. As a result, a more robust neural network architecture is desirable, to be able to model clean audio as well as noisy audio with high accuracy. An acoustic model with a grid-LSTM architecture, as discussed in this document, can provide accuracy equal to or better than that of an acoustic model having a convolutional layer for clean audio, e.g., low or mild noise levels. In addition, the grid-LSTM architecture provides better accuracy than a convolutional neural network architecture for audio with moderate or high levels of noise.

The multi-dimensional LSTM architectures discussed in this document also provide increased flexibility in modelling speech based on raw audio waveform data, including for multi-channel audio. While some implementations use pre-determined audio features, such as log-mel features, other implementations use a filterbank having parameters learned jointly with the neural network parameters during training of the model. These architectures can be used in a multichannel model. For example, the input can represent the audio from multiple microphones that detect the same utterance, but from a different spatial position with respect to the speaker. Modeling based on raw audio waveforms can provide additional information that would otherwise be omitted using pre-determined features. However, when the learned filterbank is not constant-Q, a convolutional layer may degrade performance. A model using a grid-LSTM architecture has improved accuracy compared to standard LSTM architectures and those with convolutional layers. As a result, an acoustic model with a grid-LSTM architecture can be used effectively to model time-frequency patterns when the filterbank is learned, as in the case of ASR with raw audio waveform inputs or multi-channel audio processing.

One innovative aspect of the subject matter described in this specification is embodied in methods that include the actions of: receiving, by one or more computers, audio data that describes an utterance; determining, by the one or more computers, a transcription for the utterance using an acoustic model comprising a neural network having first memory blocks for time information and second memory blocks for frequency information, the first memory blocks being different from the second memory blocks; and providing, by the one or more computers, the transcription for the utterance as output of an automated speech recognizer.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features.

In some implementations, receiving the audio data includes receiving, over a network, audio data generated by a client device; and providing the transcription includes providing, over the network, the transcription to the client device.

In some implementations, the first memory blocks and the second memory blocks are long short-term memory (LSTM) blocks.

In some implementations, the neural network includes a grid-LSTM module, a linear projection layer, one or more LSTM layers, and a deep neural network (DNN). The grid-LSTM module includes the first memory blocks and the second memory blocks, and the grid-LSTM module provides output to the linear projection layer. The linear projection layer provides output to the one or more LSTM layers. The one or more LSTM layers provide output to the DNN. The DNN can provide output of the acoustic model, or output used to determine the output of the acoustic model.

In some implementations, the neural network is configured to share information from each of the first memory blocks with a respective proper subset of the second memory blocks, and the neural network is configured to share information from each of the second memory blocks with a respective proper subset of the first memory blocks.

In some implementations, the first memory blocks are time-LSTM blocks that each have a state, and the second memory blocks are frequency-LSTM blocks that each have a state. The frequency-LSTM blocks and the time-LSTM blocks can each have a corresponding frequency step in a sequence of multiple frequency steps. The states can be determined for each of a sequence of multiple time steps. For each of at least some of the frequency-LSTM blocks, the frequency-LSTM block determines its state using the state of the time-LSTM block corresponding to the same frequency step at the previous time step. For each of at least some of the time-LSTM blocks, the time-LSTM block determines its state using the state of the frequency-LSTM block corresponding to the same time step and the previous frequency step.

In some implementations, for at least some of the time-LSTM blocks, the time-LSTM block determines its state based on (i) input received for a current time step, (ii) the state of the time-LSTM block at a previous time step, and (iii) a state of exactly one of the frequency-LSTM blocks. For at least some of the frequency-LSTM blocks, the frequency-LSTM block determines its state based on (i) input received for a current time step, (ii) the state of the frequency-LSTM block for a previous frequency step at the current time step, and (iii) a state of exactly one of the time-LSTM blocks.

In some implementations, each of the time-LSTM blocks and the frequency-LSTM blocks has one or more weights, and the weights for the time-LSTM blocks are independent of the weights for the frequency-LSTM blocks.

In some implementations, each of the time-LSTM blocks and the frequency-LSTM blocks has one or more weights, and at least some of the weights are shared between the time-LSTM blocks and the frequency-LSTM blocks.

In some implementations, the neural network is configured so that the first memory blocks do not share information with the second memory blocks.

In some implementations, determining, by the one or more computers, a transcription for the utterance using the acoustic model comprising the neural network includes: providing, as input to the neural network, input vectors having values describing the utterance; and receiving, as output of the neural network, one or more outputs that each indicate a likelihood that a respective phonetic unit represents a portion of the utterance.

In some implementations, receiving the one or more outputs includes receiving, as output of the neural network, multiple outputs corresponding to different context-dependent states of phones, and each of the multiple outputs indicates a likelihood of occurrence for the corresponding context-dependent state.

In some implementations, providing the input vectors includes providing input vectors comprising values for log-mel features.

In some implementations, providing the input vectors includes providing values representing audio waveform features. The acoustic model includes a filterbank having parameters trained jointly with weights of the neural network.

In some implementations, providing the input vectors includes providing values representing characteristics of multiple channels of audio describing the utterance.

Advantageous implementations can include one or more of the following features. The speed and accuracy of speech recognition may be improved, for example, through the use of multi-dimensional architectures that include separate memory blocks for different dimensions, e.g., time and frequency. These architectures can further improve accuracy in recognizing speech in the presence of noise, through improved modeling of correlations in time and frequency. Accuracy for noisy data may also be improved by modeling localized relationships in input data without using a convolutional layer, which can decrease accuracy when noise is present.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
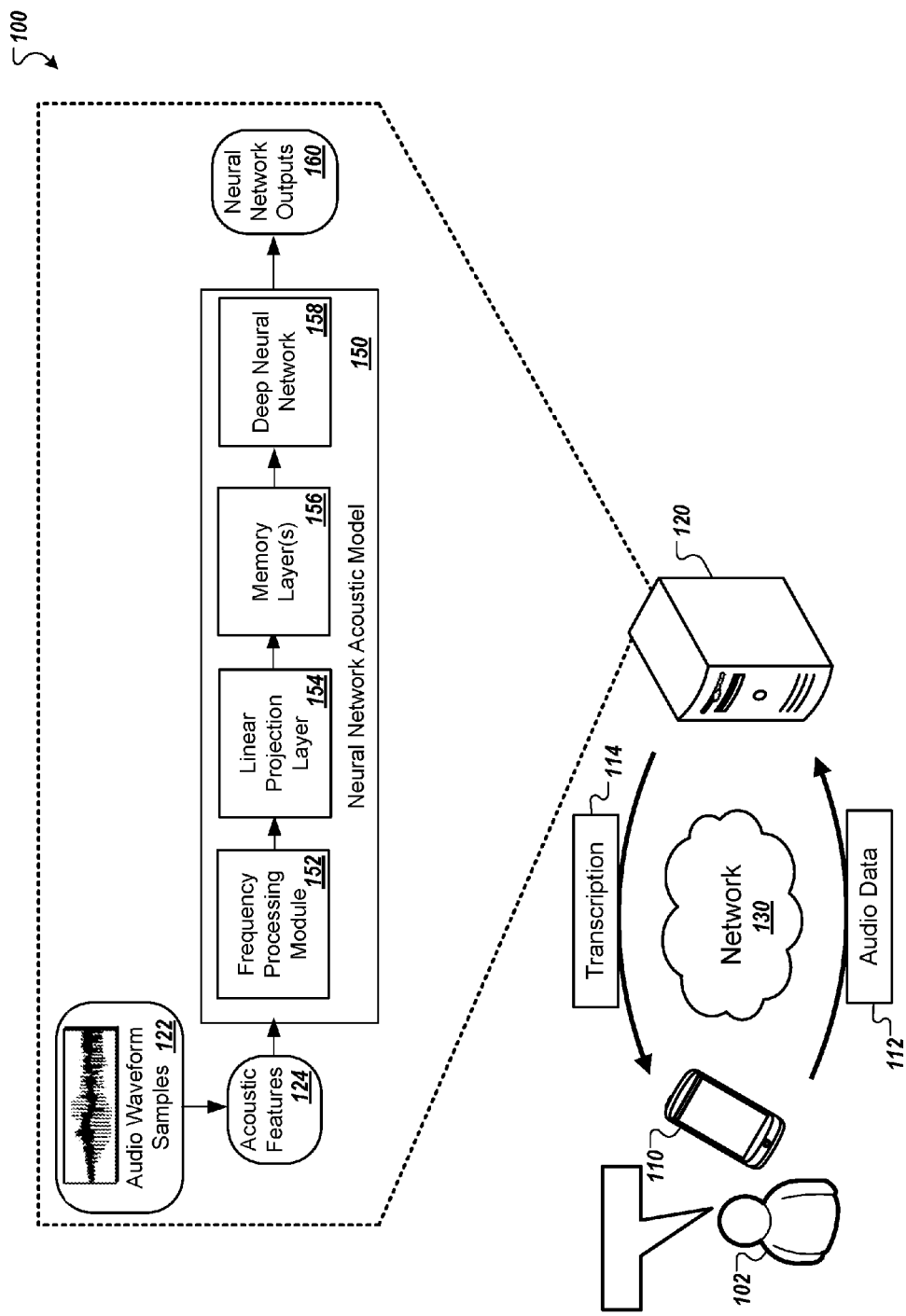
FIG. 1 is a diagram that illustrates an example of a system for performing speech recognition.

FIG. 1 is a diagram that illustrates an example of a system 100 for performing speech recognition. The system 100 includes a client device 110, a computing system 120, and a network 130. In the example, the computing system 120 provides information about an utterance to a neural network 150 that has been trained as an acoustic model. The computing system 120 uses output from the neural network 150 to determine a transcription for the utterance.

In some implementations, a neural network architecture can model two-dimensional correlations in an input signal using a two-dimensional architecture such as time-frequency LSTMs, grid LSTMs, and ReNet LSTMs. For example, an LSTM architecture can be used to model time-frequency patterns as the first layer in an LDNN architecture. In some implementations, grid-LDNNs offer improved accuracy over prior LDNN and CLDNN architecture on large vocabulary Voice Search tasks. Accuracy can also be improved in noisy conditions or when the learned filterbank is not constant-Q.

As discussed further below, the neural network 150 includes a frequency processing module 152 that can be used to process input to the neural network 150 before passing information to other layers of the neural network 150. A number of different techniques and architectures may be used for the frequency processing module 152. In particular, the frequency processing module 152 can be a multi-dimensional layer that includes memory blocks for multiple dimensions. For example, the frequency processing module 152 can include a grid-LSTM architecture that with separate LSTM memories for frequency and time correlations. Certain memories in the grid-LSTM architecture can share information. Thus, while relationships in time and frequency can be modeled by separate blocks, patterns among time and frequency can also be more accurately modeled. The grid-LSTM architecture can provide improved accuracy compared to other modeling techniques, especially when significant noise is present in the audio data. Various different types of architectures that can be used for the frequency processing module 152 are discussed below.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In the example of FIG. 1, a user 102 of the client device 110 speaks, and the client device 110 records audio that includes the utterance. The client device 110 sends the recorded audio data 112, e.g., audio waveform data, over the network 130 to the computing system 120, which provides an automated speech recognition service. Depending on the implementation, the client device 110 may record and send audio data 112 for a single channel, e.g., from a single microphone, or for multiple channels, e.g., recorded from multiple microphones.

The computing system 120 receives the audio data 112 and begins processing audio waveform samples 122 from the audio data 112. For example, the computing system 120 may divide the audio waveform samples 122 into sets corresponding to different time periods or windows of the audio data 112. For example, windows of 25 or 35 milliseconds of audio may be used, and in some implementations the windows may partially overlap.

In some implementations, the raw audio waveform samples in the windows can be used as input to the neural network 150. In other implementations, acoustic features 124 are extracted from the audio samples. In the example of FIG. 1, a set log-mel features are extracted from the audio samples in each time window.

The computing system 120 then provides the acoustic features 124 to the neural network 150. For example, the acoustic features 124 are provided in a series of input vectors input to the neural network 150 one at a time. Each input vector represents a different time step in a sequence, for example, a different time window in the series of time windows of the utterance. Each includes the log-mel features for a different time window of the utterance, or may include log-mel features for multiple time windows.

In the illustrated example, the neural network 150 has been previously trained to act as an acoustic model. For example, the neural network 150 indicates likelihoods that different speech units correspond to portions of the utterance based on the input vectors including the acoustic features 124. The neural network 150 can be a recurrent neural network that can thus use information from previous time steps to determine a prediction for a current time step.

The neural network 150 includes a frequency processing module 152 that is used to model patterns in the acoustic features 124 in time and frequency. As discussed below, this frequency processing module 152 can include a memory architecture that uses LSTMs to model these patterns. The correlations in the acoustic features in frequency and time may be modeled separately using different LSTM blocks. The LSTM blocks for the time and frequency may be connected so that they share information between certain blocks also.

The output of the frequency processing module 152 is provided to a linear projection layer 154. For example, some or all of the LSTMs in the frequency processing module 150 can provide their outputs to the linear projection layer 154 for each time step. The linear projection layer 154 can then reduce the dimensionality of these outputs. For example, several hundred or a thousand or more outputs of the frequency processing module 152 can be projecting to a lower-dimension of 256 values.

The output of the linear projection layer 154 is provided to one or more memory layers 156. For example, three memory layers 156 may be used, arranged in sequence so that the first memory layer passes its output to the second memory layer, which passes its output to the third memory layer. The one or more memory layers 156 may include LSTMs configured to model correlations in time.

The output of the one or more memory layers 156, e.g., the output of the last of the memory layers 156, is provided to a deep neural network (DNN) 158. The DNN 158 includes at least one hidden layer and at least one output layer.

The neural network 150 produces neural network outputs 160, which the computing system 120 uses to identify a transcription 114 for the audio data 112. The neural network outputs 160 indicates likelihoods that the speech in a particular window, for example, in response to the input feature vector for the particular time window, represents specific phonetic units. In some implementations, the phonetic units used are phones or states of phones. In the example, the potential phones are referred to as s0 . . . sm. The phones may be any of the various phones in speech, such as an "ah" phone, an "ae" phone, a "zh" phone, and so on. The phones may include all of the possible phones that may occur in the audio waveform samples 122, or fewer than all of the phones that may occur. Each phone can be divided into acoustic states. In some implementations, these phonetic units are context-dependent or context-independent hidden markov model (HMM) states of phones. Each phone may be divided into three states.

The neural network outputs 160 provide predictions or probabilities of acoustic states given the data included in the acoustic features 124. In some implementations, the neural network outputs 160 provide a value, for each state of each phone, which indicates the probability that an acoustic feature vector represents the particular state of the particular phone. For example, in some implementations, the output layer may provide 13,522 output values each corresponding to different context-dependent states.

The computing system 120 provides different sets of acoustic feature vectors to the neural network 150 to receive predictions or probabilities of the acoustic states in different windows. The computing system 120 may apply a sliding window to the acoustic feature vectors to select different sets. In this manner, the computing system 120 may obtain outputs corresponding to each position of the sliding window across the acoustic feature vectors.

The computing system 120 may provide the neural network outputs 160 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 114 is derived. The computing system 120 then provides the transcription 114 to the client device 110 over the network 130.

In the neural network 150, a number of different architectures can be used for the frequency processing module 152. Convolutional Neural Networks (CNNs) and Long-Short Term Memory Recurrent Neural Networks (LSTMs) have been used as alternatives to Deep Neural Networks for large vocabulary continuous speech recognition (LVCSR) tasks. CNNs, LSTMs and DNNs are limited in their individual modeling capabilities, however.

Combinations of these techniques can improve performance in some instances. For example, an architecture having one or more CNN layers, one or more LSTM layers, and a DNN (CLDNN) can combine the modeling benefits of all three architectures in a unified framework. Convolutional layers in the CLDNN model achieve local translation invariance through local filters and pooling. This requires tuning both the filter size and pooling size, which is typically done experimentally. Since pooling is done on linear shifts of the convolutional filter, it is most effective when the filterbank is constant-Q (such as log-mel) and therefore a linear shift across filters corresponds to a linear shift in pitch. Pooling is less effective when the filterbank deviates from being constant-Q, for example with raw-waveform modeling where the filterbank is learned in the network. In addition, convolution layers tend to hurt performance in very noisy conditions.

Frequency LSTMs (F-LSTM) and Time-Frequency LSTMs (TF-LSTMs) are alternatives to CNNs to model correlations in frequency. F-LSTMs and TF-LSTMs capture translation invariance through local filters and recurrent connections. Since they do not require any pooling operations, they can be more adaptable to different types of input features.

For mild speech with low noise levels, networks with an F-LSTM layer and a DNN (F-LDNNs) and CLDNNs often provide similar accuracy, which indicates that an F-LSTM layer has similar modeling capabilities to a convolutional layer. Furthermore, using an architecture with a TF-LSTM and DNN (TF-LDNNs), which give stronger modeling capabilities, a relative improvement in word error rate (WER) can be obtained over a strong CLDNN model. For moderate and high noise levels, convolution generally hurts accuracy. TF-LDNNs generally provide a relative improvement in accuracy over LDNNs also.

In some implementations, the frequency processing module 152 includes LSTMs corresponding to multiple different dimensions. These multi-dimensional LSTM architectures can improve accuracy further by better modeling relationships between multiple dimensions. For example, a grid LSTM can include LSTMs for both time and frequency dimensions. There are separate LSTMs for the different dimensions, but the architecture includes links or connections that can allow information to be shared between the memory cells for the different dimensions. When the LSTMs overlap at a specific time-frequency point, the gate functions and output activations are computed using both time LSTM cell states and frequency LSTM cell states. Grid LSTMs offer the benefit of independently modeling time and frequency correlations. For recognizing speech from noisy audio data, a grid-LDNN can provide an improvement in accuracy over a TF-LDNN, for audio with low and high levels of noise.

ReNets are another type of multi-dimensional LSTM. ReNets have completely separate time and frequency LSTMs which do not include states of both during overlap. The potential benefit of ReNets is that they are easier to parallelize since the time and frequency LSTMs move independently. However, architectures using ReNets to not always improve modeling performance, and may provide slightly lower performance than TF-LDNNs and grid-LDNNs. Nevertheless, due to the benefits of parallelization, ReNets may be appropriate for various implementations.

Multi-dimensional LSTM architectures can also be used in implementations where the parameters of the filterbank are learned, for example, when raw audio waveform data is provided rather than values for pre-defined features (e.g., log-mel features). These architectures can be used in a multichannel model. The input can represents the audio from multiple microphones that simultaneously detect the same utterance, but from a different spatial position with respect to the speaker. When the learned filterbank is not constant-Q, a convolutional layer may degrade performance with respect to an LDNN. However, the grid-LDNN provides a relative improvement over the LDNN architecture, which demonstrates the benefit of modeling time-frequency patterns with an LSTM rather than a convolutional layer when the filterbank is learned.

Figure 2:
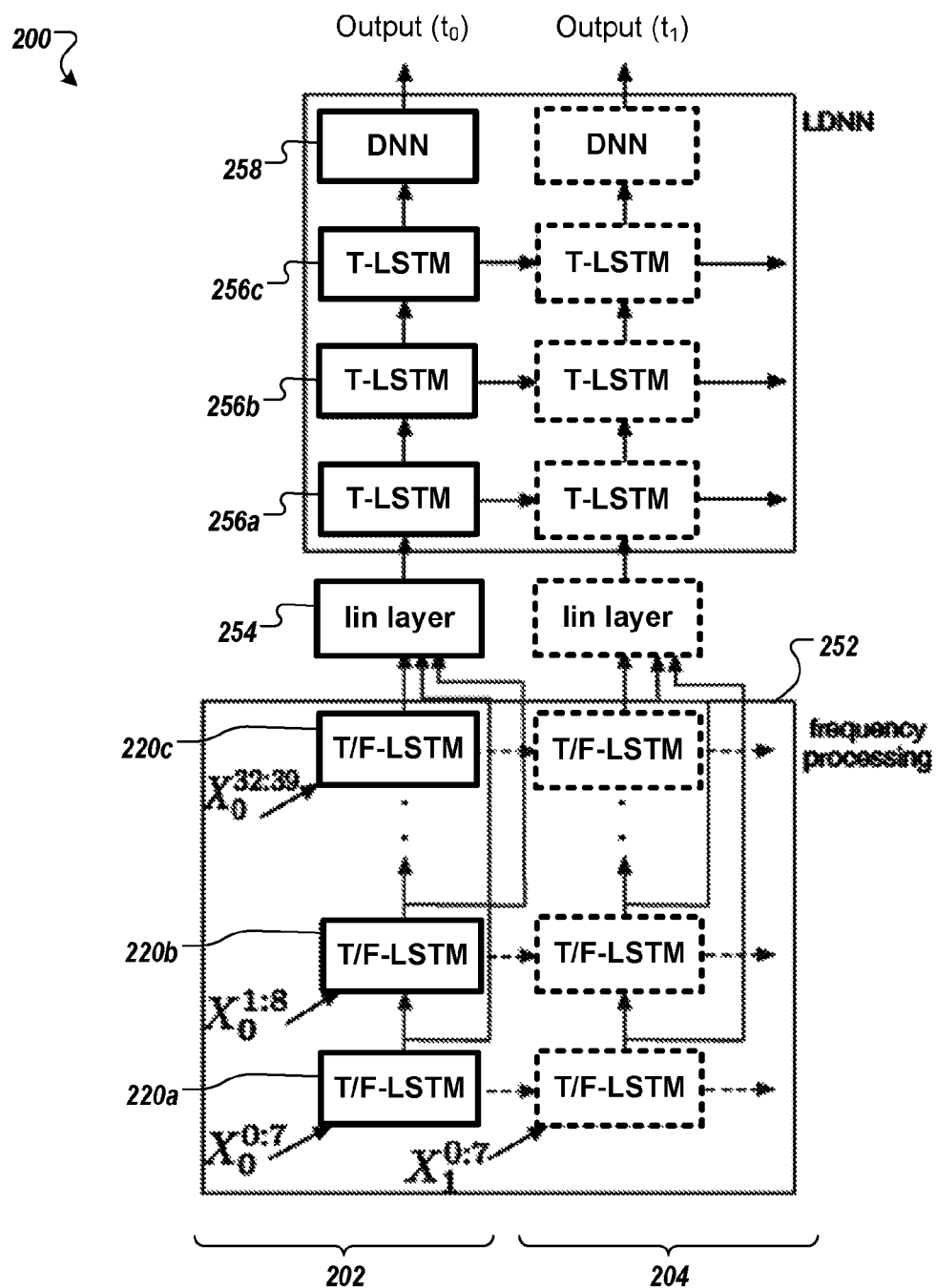
FIG. 2 is a diagram that illustrates an example of a neural network acoustic model.

FIG. 2 is a diagram that illustrates an example of a neural network acoustic model 200. The neural network 200 includes a frequency processing module 152, a linear low-rank layer 154, memory layers 156a-156c, and a DNN 158. Several variations of the frequency processing module 152 are discussed below.

In general, the network 200 discussed herein use a frame $x_t$ as input to the network. For simplicity, the frame $x_t$ can be considered to be a log-mel filterbank feature, although other types of features can be used. Then, this frame can be optionally processed in frequency by either CNN or LSTM layers, as denoted by the frequency-processing block 252 in FIG. 2. If no frequency processing is performed, the frame $x_t$ is passed directly to the first LSTM layer, and the architecture would be an LDNN. The output of the frequency processing module 252 is passed to a linear low-rank layer 254. For example, the low-rank layer can be a 256-dimensional layer.

The output of the low-rank layer 254 is passed to one or more LSTM layers 256a-256c. For example, three LSTM layers 256a-256c may be used. The one or more LSTM layers 256a-256c can be arranged so that the first passes its output to the second LSTM layer, and the second LSTM passes its output to the third LSTM layer. In some implementations, each layer has 832 cells and a 512 unit projection layer.

The output from the one or more LSTM layers 256a-256c is provided to the DNN 258 which can include one or more hidden layers. In some implementations, the DNN layer has 1,024 hidden units.

The output of the one or more hidden layers of the DNN 258 is provided to an output layer. For example, the output layer can be a softmax output layer. The outputs of the output layer can represent values corresponding to different phonetic units. For example, the respective outputs may each correspond to a different context-dependent HMM state of a phone. For example, in some implementations, the output layer may provide 13,522 output values each corresponding to different context-dependent states. Each output can be indicative of a posterior probability of occurrence of the context-dependent state corresponding to the output.

Various different types of frequency processing modules 252 can be used. For a convolutional layer may be used, with 256 feature maps. The filter size and pooling size are dependent on the input feature dimension for $x_t$. For example, for a 128-dimensional input, a 21×1 frequency-time filter can be used for the convolutional layer. Non-overlapping max pooling can be used, and pooling can be performed only in frequency and with a pooling size of 9.

Instead of including a convolutional layer, the frequency processing module 252 can include LSTM blocks. The LSTM architecture, consists of a set of recurrently connected subnetworks, referred to a memory blocks. Each memory block contains memory cells to store the temporal state of the network, as well as three multiplicative gate units to control information flow. The input gate controls the information passed from the input activations into the memory cells, while the output gate controls the information passed from the memory cells to the rest of the network.

Finally, the forget gate adaptively reset's the memory of the cell. At each step j, the LSTM model is given by the following equations:

$$i_j = \sigma(W_{ix}x_j + W_{im}m_{t-1} + W_{ic}c_{t-1} + b_i) \quad (1)$$

$$f_j = \sigma(W_{fx}x_j + W_{mf}m_{t-1} + W_{cf}c_{t-1} + b_f) \quad (2)$$

$$c_j = f_j \odot c_{t-1} + i_j \odot g(W_{cx}x_j + W_{cm}m_{t-1} + b_c) \quad (3)$$

$$o_j = \sigma(W_{ox}x_j + W_{om}m_{t-1} + W_{oc}c_j + b_o) \quad (4)$$

$$m_j = o_j \odot h(c_j) \quad (5)$$

where $i_j$, $f_j$, $c_j$, and $o_j$ denote the input, forget, memory cell and output gate activations at step j. In these equations, $m_j$ is the output of the LSTM layer. W are the different weight matrices, for example, $W_{ix}$ is the weight matrix from the input gate to the input. $\odot$ is an element-wise dot product. Finally, σ is the logistic sigmoid non-linearity while g and h are the cell input and output activations, which we take to be tan h. An LSTM is typically used to model the speech signal in time, namely the input to the LSTM at each time step t is given by $x_j = x_t$. Thus, we will refer to the above model as a time LSTM (T-LSTM) for simplicity. This type of layer is used in the LDNN architecture in FIG. 2.

The frequency LSTM (F-LSTM) uses the same equations as given above, except that it is used to model a sequential process in frequency. Given input feature $x_t \in \Re^N$, the first F elements are windowed from this feature, denoted by $x_0 = x_t^{0:F} \in \Re^F$ and give this as input to the LSTM. At the next step, the system strides the window over the input by S, and take the next F features, denoted by $x_1 = x_t^{S:(F+S)} \in \Re^F$, and passes this to the LSTM.

Hence the input to the LSTM (Equations (1)-(5)) at each frequency step k is given by $x_j = x_k = x_t^{k*S:(F+k*S)}$. In most cases S<F so the chunks have overlapping information. The F-LSTM is thus unrolled over frequency by an amount L=(N−F)/S+1. This process is shown in FIG. 2. The output out of each F-LSTM, denoted by {m0, . . . , mL} are concatenated together and given to a linear dimensionality-reduction layer, and then given to an LDNN. The F-LSTM with LDNN architecture is referred to as an F-LDNN. As examples of parameters that can be used, feature dimension N=128, filter size F=24, stride S=4, and LSTM cells to be 64, to match similar filter sizes and parameters with the CNN.

The F-LSTM is similar to the convolutional layer as both models look over a small local frequency patch and share model parameters as the filter is shifted. The main difference is that the F-LSTM models frequency variations through a recurrent state that is passed from one unrolled time step to another. However, the convolutional layer has a subsequent pooling step to achieve local translational invariance. The recurrent state in F-LSTMs can emulate local competition among features similar to max pooling. However, F-LSTMs have the added benefit that there is no need to tune the pooling parameters.

The F-LSTM can be extended to model the sequential process of the signal in both time and frequency jointly with a time frequency LSTM (TF-LSTM). Since speech has correlations in both time and frequency, the TF-LSTMs often performs as as if not better than the F-LSTM. For each frequency step k and time step t, the TF-LSTM is given by the Equations 6-10.

$$i_{t,k} = \sigma(W_{ix}x_{t,k} + W_{im}^{(t)}m_{t-1,k} + W_{im}^{(k)}m_{t,k-1} + W_{ic}c_{t-1,k} + b_i) \quad (6)$$

$$f_{t,k} = \sigma(W_{fx}x_{t,k} + W_{fm}^{(t)}m_{t-1,k} + W_{fm}^{(k)}m_{t,k-1} + W_{cf}c_{t-1,k} + b_f) \quad (7)$$

$$c_{t,k} = f_{t,k} \odot c_{t-1,k} + i_{t,k} \odot g(W_{cx}x_j + W_{cm}m_{t-1,k} + b_c) \quad (8)$$

$$o_{t,k} = \sigma(W_{ox}x_{t,k} + W_{om}^{(t)}m_{t-1,k} + W_{om}^{(k)}m_{t,k-1} + W_{oc}c_{t,k} + b_o) \quad (9)$$

$$m_{t,k} = o_{t,k} \odot h(c_{t,k}) \quad (10)$$

In comparison to the F-LSTM and T-LSTM in Equations (1)-(5), the TF-LSTM uses the output from the previous frequency step (i.e., $m_{t,k-1}$) and the previous time step (i.e., $m_{t-1,k}$). These previous outputs are weighted by separate weights $W_{*m}^{(t)}$ and $W_{*m}^{(k)}$ respectively. Notice the TF-LSTM still produces one output, $m_{t,k}$, at each time-frequency (k, t) step. In FIG. 2, this shared output is denoted by a dotted line between LSTM blocks 220a-220c. FIG. 2 shows the state of the network 200, including LSTM blocks 220a-220c, for time step 0 in section 202. FIG. 2 shows the state of the network 200 for the next time step, time step 1, in section 204, showing how information is passed between the LSTM blocks from one time step to another.

Given input feature $x_t \in \Re^N$, the TF-LSTM still windows the input feature with a filter size of F and a stride of S, similar to the F-LSTM. At each time step t, the output out of each TF-LSTM, denoted by $\{m_t, 0, \ldots, m_{t,L}\}$ are concatenated together and given to a linear dimensionality-reduction layer, and then the LDNN.

A grid-LSTM has similarities with a TF-LSTM except there are separate LSTMs which move in time and frequency. However, at a current time-frequency bin, the grid frequency LSTM (gF-LSTM) uses the state of the grid time LSTM (gT-LSTM) from the previous time step, and similarly the gT-LSTM uses the state of the gF-LSTM from the previous frequency step. The motivation for looking at the grid-LSTM is to explore benefits of having separate LSTMs to model the correlations in time and frequency. The grid-LSTM in dimension j is given by the following equations 11-16 at each time-frequency step (t, k):

$$i_{t,k}^{(j)} = \sigma(W_{ix}^{(j)}x_{t,k} + W_{im}^{(t)}m_{t-1,k}^{(j)} + W_{im}^{(k)}m_{t,k-1}^{(k)} + W_{ic}^{(t)}c_{t-1,k}^{(t)} + W_{ic}^{(k)}c_{t,k-1}^{(k)} + b_i^{(j)}) \quad (11)$$

$$f_{t,k}^{(j)} = \sigma(W_{fx}^{(j)}x_{t,k} + W_{mf}^{(t)}m_{t-1,k}^{(t)} + W_{mf}^{(k)}m_{k-1,t}^{(k)} + W_{cf}^{(t)}c_{t-1,k}^{(t)} + W_{cf}^{(k)}c_{t,k-1}^{(k)} + b_f^{(j)}) \quad (12)$$

$$c_{t,k}^{(t)} = f_{t,k}^{(t)} \odot c_{t-1,k}^{(t)} + i_{t,k}^{(t)} \odot g(W_{cx}^{(t)}x_{t,k} + W_{cm}^{(t)}m_{t-1,k}^{(t)} + W_{cm}^{(k)}m_{t,k-1}^{(k)} + b_c^{(t)}) \quad (13)$$

$$c_{t,k}^{(k)} = f_{t,k}^{(k)} \odot c_{t,k-1}^{(k)} + i_{t,k}^{(k)} \odot g(W_{cx}^{(k)}x_{t,k} + W_{cm}^{(t)}m_{t-1,k}^{(t)} + W_{cm}^{(k)}m_{t,k-1}^{(k)} + b_c^{(k)}) \quad (14)$$

$$o_{t,k}^{(j)} = \sigma(W_{ox}^{(j)}x_{t,k} + W_{om}^{(t)}m_{t-1,k}^{(t)} + W_{om}^{(k)}m_{t,k-1}^{(k)} + W_{oc}c_{t,k}^{(t)} + W_{oc}^{(k)}c_{t,k}^{(k)} + b_o^{(j)}) \quad (15)$$

$$m_{t,k}^{(j)} = o_{t,k}^{(j)} \odot h(c_{t,k}^{(j)}) \quad (16)$$

In these equations, replacing j with t gives the gT-LSTM and with k gives the gF-LSTM. Besides the dimension dependent weight parameters $W_{**}^{(j)}$, the major difference from TF-LSTM is how each gate uses the previous output from both the gF-LSTM $m_{t,k-1}^{(k)}$ and gT-LSTM $m_{t-1,k}^{(t)}$. When the weights between two gT-LSTM and gF-LSTM are independent to each other, the computation cost of grid-LSTM is slightly higher than TF-LSTM because of the separate weight matrices that multiply the cell states in both time and frequency. When the weight matrices are shared among the time and frequency cells (for example $W_{ic}^{(t)} = W_{ic}^{(k)}$ in Equation 11), the computation of the grid-LSTM becomes similar to that of TF-LSTMs. At each time step t, the output of the gT-LSTM, denoted by $\{m_{t,0}^{(t)}, \ldots, m_{t,L}^{(t)}\}$ and gF-LSTM, denoted $\{m_{t,0}^{(k)}, \ldots, m_{t,L}^{(k)}\}$ are concatenated together and given to the linear dimensionality reduction layer, followed by the LDNN.

Another LSTM architecture that can be used in the frequency processing module 252 is a ReNet LSTM, which is an F-LSTM unrolled in frequency and T-LSTM unrolled in time. These two LSTMs are treated completely independently, meaning the recurrent state is not shared when the F-LSTM and T-LSTMs overlap. The benefit of ReNet is computational efficiency, as the two LSTMs can be run in parallel. Since the LSTMs produce independent outputs, the outputs of both can be concatenated before giving them to a linear dimensionality-reduction layer and then the LDNN.

Training for the neural network 200 can be done using a large set of training data, e.g., 2,000 hours of mild-noise training set including of 3 million English utterances. This data set is created by artificially corrupting clean utterances using a room simulator, adding varying degrees of noise and reverberation such that the overall SNR is between 5 dB and 30 dB. For example, the noise sources can be taken from YouTube and daily life noisy environmental recordings. As another example, training can be done on a moderate-noise 2,000-hour data set, where clean utterances are corrupted with both reverberation and additive noise at SNRs ranging from 0 to 20 dB. During training, the network is unrolled for 20 time steps for training with truncated backpropagation through time. In addition, the output state label is delayed by 5 frames, as we have observed that information about future frames improves the prediction of the current frame.

Multichannel implementations can be trained using a training set with similar noise configurations to the moderate noise data set, using a 2 channel linear microphone with, e.g., a 14 cm spacing. The data sets can be anonymized and hand-transcribed, and are representative of search engine voice search traffic. The neural network 200 can be trained with the cross-entropy criterion, using asynchronous stochastic gradient descent (ASGD) optimization. In some implementations, the weights for CNN and DNN layers are initialized using the Glorot-Bengio strategy, while LSTM layers are uniform randomly initialized to be between −0.02 and 0.02. An exponentially decaying learning rate, which starts at 0.004 and has a decay rate of 0.1 over 15 billion frames, can be used.

In noisier conditions, the convolution layer in a CLDNN degrades performance compared to the LDNN. Since translational invariance in the CNN is captured through local filters and pooling, it is possible that as noise corrupts the signal, it becomes more difficult to make these local decisions. However, the F-LDNN shows improvements over the CLDNN and LDNN. In fact, a relative gain observed by the CLDNN over the LDNN for clean speech, is achieved by the F-LDNN in noisier conditions. Since the F-LDNN captures translational invariance through the recurrent connections, it can better model the evolutionary path of the signal in frequency compared to the CNN. By modeling correlations in time and frequency with the TF-LDNN, improvements can be achieved over LDNN, CLDNN, and F-LDNN models.

Grid-LDNNs offer an additional relative improvement in mild and moderate noise over the TF-LDNN, with a similar computational cost since the weights of the cell state can be tied between the gT-LSTM and gF-LSTM. This shows that separate modeling of time and frequency correlations, while sharing the states, is effective to improve accuracy. In some implementations, performance with ReNet-LDNNs degrades for moderate noise conditions, showing the importance of sharing the state between T-LSTMs and F-LSTMs.

Grid LSTMs can be used when learning a filterbank directly from a raw-waveform. Specifically, this can be effective for multichannel speech processing, where raw-waveform processing is necessary to preserve the fine time structure of the signal. Grid LSTMs can be used with the neural adaptive beamforming (NAB) model. In the first layer of this model, for each frame, an "adaptive layer" takes a 35 ms input raw-waveform signal for each channel and uses a T-LSTM to predict filter coefficients for each channel. These filters are convolved with the raw-waveform from each channel and the outputs are summed, mimicking filter-and-sum beamforming. Then, a "spectral decomposition" is performed on the single channel raw-waveform, using a time-convolution layer with max-pooling. This layer essentially learns a filterbank which is not constant-Q, and produces a 128-dimensional frequency feature at each frame. This feature is then given to a CLDNN/LDNN acoustic model.

The NAB model suffers not only from the frequency convolution that sits above the spectral decomposition layer, not only because the learned filterbank is not constant-Q, but also because the filter into the spectral layer changes every frame because of the adaptive LSTM. Further improvements can be obtained replacing the CLDNN or LDNN with a grid-LDNN. Modeling time-frequency correlations with a 2D-LSTM is much more robust compared to convolution, even with a different feature representation.

As discussed above, various different 2D-LSTM approaches (F-LSTM, TF-LSTM, grid-LSTM, ReNet) can be used to model time-frequency correlations. Grid-LSTMs in the LDNN architecture (grid-LDNN) often offer the best performance of all 2D-LSTMs, particularly when the input is noisy or the filterbank is learned. Overall, the grid-LDNN shows a relative accuracy improvement over an LDNN and CLDNN for a mild noise task, moderate noise task, and multichannel task.

Figure 3:
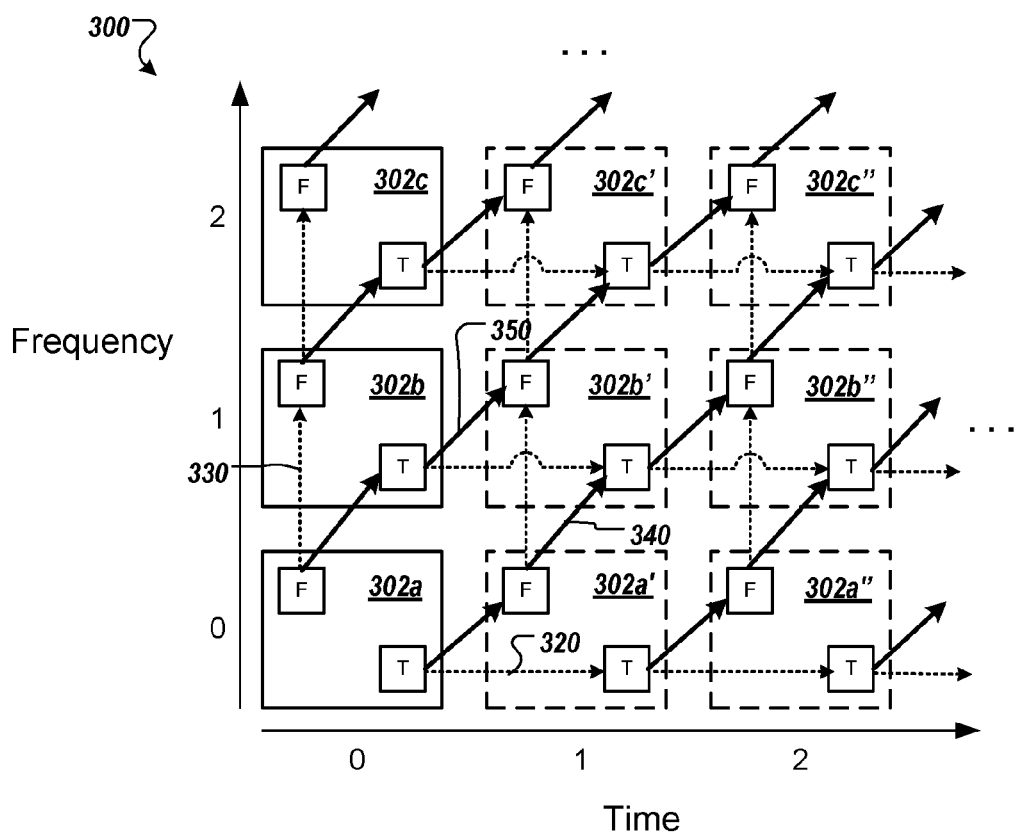
FIG. 3 is a diagram that illustrates an example of a grid LSTM architecture.

FIG. 3 is a diagram that illustrates an example of a grid LSTM architecture 300. The architecture includes a set of time-frequency bins 302a-302c that each include two LSTM blocks: a time-LSTM block denoted by T, and a frequency-LSTM block denoted by F. The time-frequency bins 302a-302c update their respective states with new input for each time step. Later states of the time-frequency bins 302a-302c are designated as 302a'-302c' for time step 1, and 302a"-302c" for time step 2. While the states for multiple time steps are illustrated, the same memories or computing resources are used for each time step. The time-frequency bins 302a'-302c' and 302a"-302c" do not represent separate memories, but rather reflect different states of the memories shown in time-frequency bins 302a-302c as time progresses.

For each time step, inputs including the audio features for the current time step are provided, with each time-frequency bin 302a-302c receiving a subset of the input vector to the neural network. For each time-frequency bin 302a-302c, the input subset includes the acoustic features for the corresponding frequency step of the time-frequency bin 302a-302c for the current time step. For example, bin 302a may receive inputs in the range [0,7] of the input vector, bin 302b may receive inputs in the range [8,15] of the input vector, and so on. Within each bin 302a-302c, both of the LSTM blocks may receive the same input values from the input vector.

In addition, the time-LSTM blocks each provide information used to calculate the state of the time-LSTM at the next time step, for the same frequency step, shown by horizontal dashed lines. For example, arrow 320 shows that the state of the time-LSTM block in bin 302a, representing time step 0 and frequency step 0, is used to determine the state of the same time-LSTM block in bin 302a' representing time step 1 and frequency step 0. This represents, for example, the ability of the time-LSTM block to remember its state from one time step to the next. Also, the frequency-LSTM blocks each provide information used to calculate the state of the frequency-LSTM at the same time step but at the next frequency step, shown by vertical dashed lines. For example, arrow 330 shows that the state of the frequency-LSTM block in bin 302a, representing time step 0 and frequency step 0, is used to determine the state of the frequency-LSTM in bin 302b representing time step 0 and frequency step 1.

Information can also be shared between the time-LSTM blocks and frequency LSTM blocks of different time-frequency bins. In addition, the time-LSTM blocks share information with certain frequency-LSTM blocks, and the frequency-LSTM blocks share information with certain time-LSTM blocks. These connections are shown by solid arrows between LSTM blocks. Each LSTM block may share information with a subset of the other LSTM blocks, and in some implementations, exactly one other LSTM block. In some implementations, this involves providing information to at least one LSTM for a different dimension (e.g., from time-LSTM block to frequency-LSTM block, or from frequency-LSTM block to time-LSTM block), and in some architectures exactly one LSTM for a different dimension. In the grid, the LSTMs may provide information to LSTMs in one or more adjacent time-frequency bins, e.g., time-frequency bins that differ by no more than one step in either dimension. In addition, or as an alternative, LSTMs in a particular time-frequency bin may share information with LSTMs in one or more time-frequency bins that are more than one step different from the particular time-frequency bin.

In the example of FIG. 3, the frequency-LSTM blocks each provide information to the time-LSTM block that is at the next frequency step and the same time step. For example, the state of the time-LSTM in bin 302b' is determined using the state of the frequency-LSTM block in time-frequency bin 302a', as shown by arrow 340. In this manner, the state of a frequency-LSTM block is used to determine the states of both the time-LSTM block and the frequency-LSTM block for the next frequency step.

In the example of FIG. 3, the time-LSTM blocks each provide information to the frequency-LSTM block that is at the next time step and the same frequency step. For example, the state of the frequency-LSTM block in time-frequency bin 302b' is determined using the state of the time-LSTM block in time-frequency bin 302b, as shown by arrow 350. In this manner, the state of at time-LSTM block is used to determine the states of both the time-LSTM block and the frequency LSTM block for the next time step.

The examples of connections between time-LSTMs and frequency-LSTMs in the grid architecture is provided as an example, and other arrangements having more or fewer connections between the LSTM blocks can be used.

Figure 4:
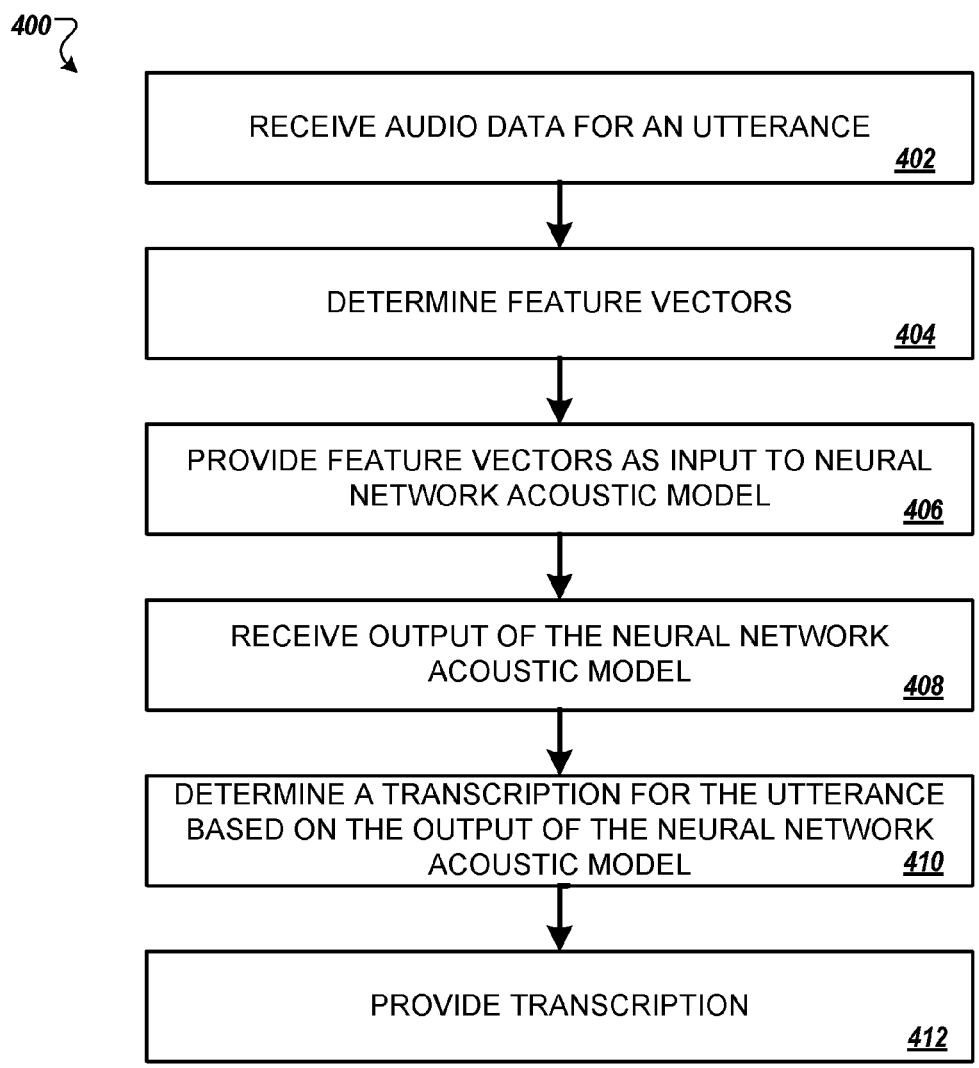
FIG. 4 is a flow diagram that illustrate an example of a process for performing speech recognition.

FIG. 4 is a flow diagram that illustrate an example of a process 400 for performing speech recognition. The process 400 may be performed by one or more computers, such as the computing system 120 of FIG. 1.

Audio data for an utterance is received (402). This audio data may include audio data for a single channel or multiple channels of audio. For example, one or more channels of audio detected by one or more microphones of a user device, such as a phone, watch, tablet computer, etc., can be generated. The audio can be provided to a speech recognition module, for example, to a server system over a network, or to a local software module of the user device.

Feature vectors are determined from the audio data (404). The feature vectors may include, for example, log-mel filterbank features. In some implementations, audio samples rather than filter outputs or other designed features may be used.

The feature vectors are provided as input to a neural network acoustic model (406). The input feature vectors can include values for log-mel features. Alternatively, the input vectors may comprise values representing audio waveform characteristics. When audio waveform data is provided, the acoustic model may include filterbank parameters trained jointly with weights of the neural network. The audio waveform data may describe two channels of audio that include the utterance, for example, data describing recordings of the utterance from different spatial positions. A frequency processing module, or other portion of the neural network acoustic model, may implement spatial filtering, e.g., beamforming, to cause enhance recognition.

The neural network acoustic model can include a frequency processing module that performs multi-dimensional modeling of time and frequency information. For example, the neural network can have first memory blocks for time information and second memory blocks for frequency information, where the first memory blocks are different from the second memory blocks. The first memory blocks and the second memory blocks can be long short-term memory (LSTM) blocks. For example, the frequency processing module can include a grid-LSTM architecture separate LSTM blocks for both time and frequency. The neural network may be configured to share information from each of the first memory blocks with a respective proper subset of the second memory blocks, and the neural network can be configured to share information from each of the second memory blocks with a respective proper subset of the first memory blocks.

In some implementations, the first memory blocks are time-LSTM blocks that each have a state, and the second memory blocks are frequency-LSTM blocks that each have a state. Each of the time-LSTM blocks and the frequency-LSTM blocks has a corresponding frequency step in a sequence of multiple frequency steps. The states are determined for each of a sequence of multiple time steps. For each of at least some of the frequency-LSTM blocks, the frequency-LSTM block determines its state using the state of the time-LSTM block corresponding to the same frequency step at the previous time step. For each of at least some of the time-LSTM blocks, the time-LSTM block determines its state using the state of the frequency-LSTM block corresponding to the same time step and the previous frequency step.

In some implementations, for at least some of the time-LSTM blocks, the time-LSTM block determines its state based on (i) input received for a current time step, (ii) the state of the time-LSTM block at a previous time step, and (iii) a state of exactly one of the frequency-LSTM blocks. For at least some of the frequency-LSTM blocks, the frequency-LSTM block determines its state based on (i) input received for a current time step, (ii) the state of the frequency-LSTM block for a previous frequency step at the current time step, and (iii) a state of exactly one of the time-LSTM blocks.

In some implementations, the neural network includes a grid-LSTM module, a linear projection layer, one or more LSTM layers, and a deep neural network (DNN). The grid-LSTM module includes the first memory blocks and the second memory blocks, and the grid-LSTM module provides output to the linear projection layer. The linear projection layer provides output to the one or more LSTM layers, and the one or more LSTM layers provide output to the DNN.

Output of the neural network acoustic model is received (408). For example, one or more outputs can be received that each indicate a likelihood that a respective phonetic unit represents a portion of the utterance. The neural network can provide multiple outputs corresponding to different context-dependent states of phones. Each of the multiple outputs can indicate a likelihood of occurrence for the corresponding context-dependent state. Thus, for a particular time step representing a particular portion of an utterance, the neural network may provide outputs that indicate a probability distribution showing the likelihood that the particular portion of the utterance represents various context-dependent states.

A transcription for the utterance is determined using the output of the neural network acoustic model (410). The outputs of the neural network acoustic model for several time steps can be used to determine which sounds or states are most likely part of the utterance. A language model can be used to determine which sequence of words most closely match the sequences of sounds or states determined by the neural network acoustic model.

The transcription is provided, for example, for display, to an application, or to a device (412). For example, the audio data can be audio data generated by a client device and received over a network, and the transcription can be provided over the network to the client device. In addition, or as an alternative, a server system can determine that the utterance represents a request, such as a query or a voice command, and the server system can provide results to the query or information allowing the client device to carry out the request.

In some implementations, each of the time-LSTM blocks and the frequency-LSTM blocks has one or more weights, and the weights for the time-LSTM blocks are independent of the weights for the frequency-LSTM blocks. As an alternative, each of the time-LSTM blocks and the frequency-LSTM blocks has one or more weights, and at least some of the weights are shared between the time-LSTM blocks and the frequency-LSTM blocks. In some implementations, all of the weights are shared between the time-LSTM and frequency-LSTM blocks.

In some implementations, the neural network is configured so that the first memory blocks do not share information with the second memory blocks. For example, ReNets can be used in the neural network.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input

What is claimed is:

1. A method performed by one or more computers, the method comprising:
    receiving, by the one or more computers, audio data that describes an utterance;
    processing the audio data using a neural network that has been trained as an acoustic model, wherein the processing comprises: providing, as input to the neural network, input vectors having values describing the utterance, the values including values representing audio waveform features, wherein the audio waveform features are determined using a filterbank having parameters trained jointly with weights of the neural network, wherein the neural network has first memory blocks for time information and second memory blocks for frequency information, the first memory blocks being different from the second memory blocks;
        wherein the first memory blocks are time-LSTM blocks that each have a state, and wherein the second memory blocks are frequency-LSTM blocks that each have a state and a corresponding frequency step in a sequence of multiple frequency steps, wherein the states are determined for each of a sequence of multiple time steps;
        wherein, for each of at least some of the frequency-LSTM blocks, the frequency-LSTM block determines its state using the state of the time-LSTM block corresponding to the same frequency step at the previous time step; and
        wherein, for each of at least some of the time-LSTM blocks, the time-LSTM block determines its state using the state of the frequency-LSTM block corresponding to the same time step and the previous frequency step;
    receiving, as output of the neural network, one or more scores that each indicate a likelihood that a respective phonetic unit represents a portion of the utterance;
    determining, by the one or more computers, a transcription for the utterance based on the one or more scores; and
    providing, by the one or more computers, the determined transcription as output of an automated speech recognizer.

2. The method of claim 1, wherein receiving the audio data comprises receiving, over a network, audio data generated by a client device; and
    wherein providing the transcription comprises providing, over the network, the transcription to the client device.

3. The method of claim 1, wherein the neural network comprises a grid-LSTM module, a linear projection layer, one or more LSTM layers, and a deep neural network (DNN);
    wherein the grid-LSTM module includes the first memory blocks and the second memory blocks, and the grid-LSTM module provides output to the linear projection layer;
    wherein the linear projection layer provides output to the one or more LSTM layers; and
    wherein the one or more LSTM layers provide output to the DNN.

4. The method of claim 1, wherein the neural network is configured to share information from each of the first memory blocks with a respective proper subset of the second memory blocks, and the neural network is configured to share information from each of the second memory blocks with a respective proper subset of the first memory blocks.

5. The method of claim 1, wherein, for at least some of the time-LSTM blocks, the time-LSTM block determines its state based on (i) input received for a current time step, (ii) the state of the time-LSTM block at a previous time step, and (iii) a state of exactly one of the frequency-LSTM blocks; and wherein, for at least some of the frequency-LSTM blocks, the frequency-LSTM block determines its state based on (i) input received for a current time step, (ii) the state of the frequency-LSTM block for a previous frequency step at the current time step, and (iii) a state of exactly one of the time-LSTM blocks.

6. The method of claim 1, wherein each of the time-LSTM blocks and the frequency-LSTM blocks has one or more weights, and wherein the weights for the time-LSTM blocks are independent of the weights for the frequency-LSTM blocks.

7. The method of claim 1, wherein each of the time-LSTM blocks and the frequency-LSTM blocks has one or more weights, and wherein at least some of the weights are shared between the time-LSTM blocks and the frequency-LSTM blocks.

8. The method of claim 1, wherein receiving the one or more scores comprises receiving, as output of the neural network, multiple outputs corresponding to different context-dependent states of phones, wherein each of the multiple outputs indicates a likelihood of occurrence for the corresponding context-dependent state.

9. The method of claim 1, wherein providing the input vectors comprises providing input vectors comprising values for log-mel features.

10. The method of claim 1, wherein providing the input vectors comprises providing values representing characteristics of multiple channels of audio describing the utterance.

11. The method of claim 1, wherein processing the audio data using the neural network comprises processing audio data representing characteristics of multiple channels of audio describing the utterance.

12. A system comprising:
one or more computers and one or more storage devices storing instructions that are operable, when executed by the one or more computers, to cause the one or more computers to perform operations comprising:
receiving, by the one or more computers, audio data that describes an utterance;
processing the audio data using a neural network that has been trained as an acoustic model, wherein the processing comprises: providing, as input to the neural network, input vectors having values describing the utterance, the values including values representing audio waveform features, wherein the audio waveform features are determined using a filterbank having parameters trained jointly with weights of the neural network, wherein the neural network has first memory blocks for time information and second memory blocks for frequency information, the first memory blocks being different from the second memory blocks;
wherein the first memory blocks are time-LSTM blocks that each have a state, and wherein the second memory blocks are frequency-LSTM blocks that each have a state and a corresponding frequency step in a sequence of multiple frequency steps, wherein the states are determined for each of a sequence of multiple time steps;
wherein, for each of at least some of the frequency-LSTM blocks, the frequency-LSTM block determines its state using the state of the time-LSTM block corresponding to the same frequency step at the previous time step; and
wherein, for each of at least some of the time-LSTM blocks, the time-LSTM block determines its state using the state of the frequency-LSTM block corresponding to the same time step and the previous frequency step;
receiving, as output of the neural network, one or more scores that each indicate a likelihood that a respective phonetic unit represents a portion of the utterance;
determining, by the one or more computers, a transcription for the utterance based on the one or more scores; and
providing, by the one or more computers, the determined transcription as output of an automated speech recognizer.

13. The system of claim 12, wherein the neural network comprises a grid-LSTM module, a linear projection layer, one or more LSTM layers, and a deep neural network (DNN);
wherein the grid-LSTM module includes the first memory blocks and the second memory blocks, and the grid-LSTM module provides output to the linear projection layer;
wherein the linear projection layer provides output to the one or more LSTM layers; and
wherein the one or more LSTM layers provide output to the DNN.

14. The system of claim 12, wherein processing the audio data using the neural network comprises processing audio data representing characteristics of multiple channels of audio describing the utterance.

15. One or more non-transitory computer-readable storage media storing a computer program, the program comprising instructions that when executed by one or more computers cause the one or more computers to perform operations comprising:
receiving, by the one or more computers, audio data that describes an utterance;
processing the audio data using a neural network that has been trained as an acoustic model, wherein the processing comprises: providing, as input to the neural network, input vectors having values describing the utterance, the values including values representing audio waveform features, wherein the audio waveform features are determined using a filterbank having parameters trained jointly with weights of the neural network, wherein the neural network has first memory blocks for time information and second memory blocks for frequency information, the first memory blocks being different from the second memory blocks;
wherein the first memory blocks are time-LSTM blocks that each have a state, and wherein the second memory blocks are frequency-LSTM blocks that each have a state and a corresponding frequency step in a sequence of multiple frequency steps, wherein the states are determined for each of a sequence of multiple time steps;
wherein, for each of at least some of the frequency-LSTM blocks, the frequency-LSTM block determines its state using the state of the time-LSTM block corresponding to the same frequency step at the previous time step; and
wherein, for each of at least some of the time-LSTM blocks, the time-LSTM block determines its state using the state of the frequency-LSTM block corresponding to the same time step and the previous frequency step;

receiving, as output of the neural network, one or more scores that each indicate a likelihood that a respective phonetic unit represents a portion of the utterance;

determining, by the one or more computers, a transcription for the utterance based on the one or more scores; and providing, by the one or more computers, the determined transcription as output of an automated speech recognizer.

16. The one or more non-transitory computer-readable storage media of claim 15, wherein processing the audio data using the neural network comprises processing audio data representing characteristics of multiple channels of audio describing the utterance.

* * * * *